O. G. JONES.
VEHICLE FENDER.
APPLICATION FILED JAN. 25, 1921.

1,425,659.

Patented Aug. 15, 1922.
3 SHEETS—SHEET 1.

INVENTOR
Omar G. Jones
By W. W. Williamson
Atty.

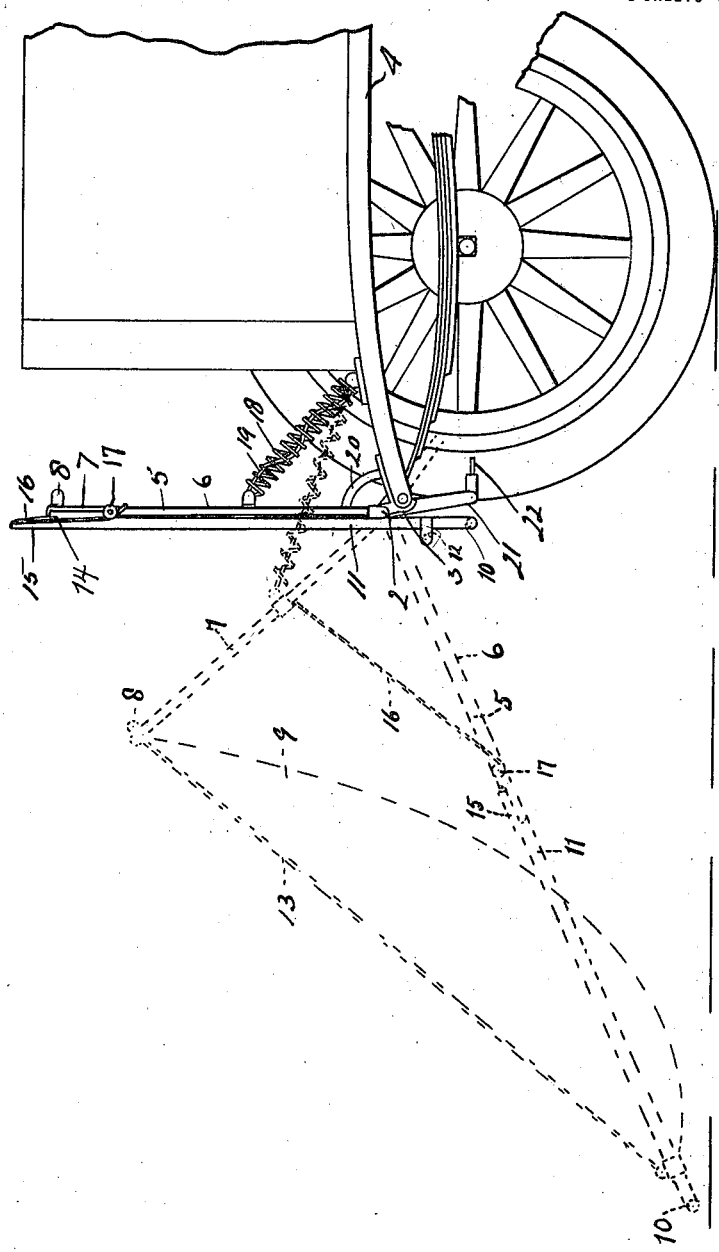

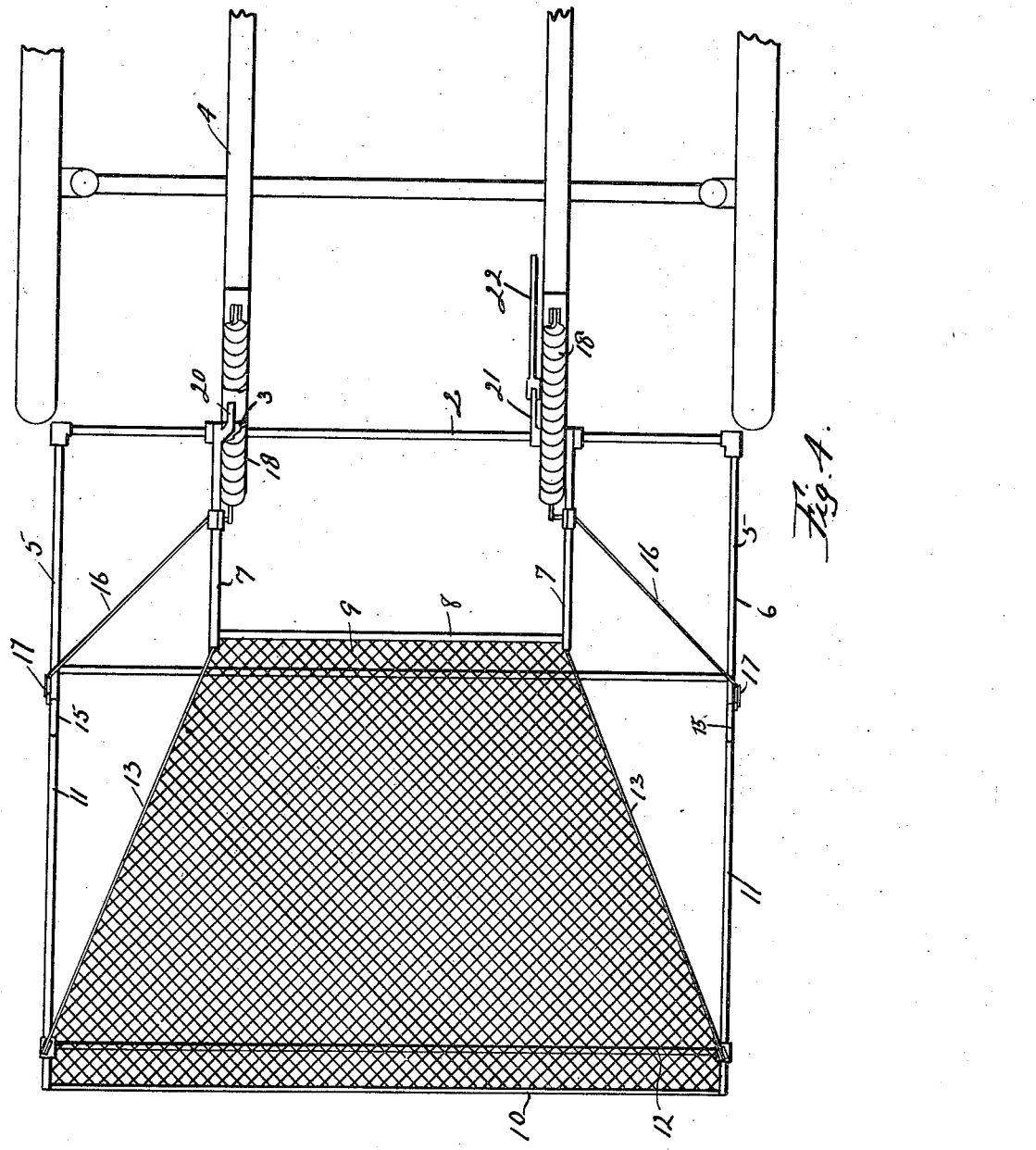

UNITED STATES PATENT OFFICE.

OMAR G. JONES, OF PHILADELPHIA, PENNSYLVANIA.

VEHICLE FENDER.

1,425,659.  Specification of Letters Patent.  Patented Aug. 15, 1922.

Original application filed October 9, 1920, Serial No. 415,849. Divided and this application filed January 25, 1921. Serial No. 439,763.

*To all whom it may concern:*

Be it known that I, OMAR G. JONES, a citizen of the United States, residing at Philadelphia, in the county of Philadelphia and State of Pennsylvania, have invented new and useful Improvements in Vehicle Fenders, of which the following is a specification.

My invention relates to new and useful improvements in vehicle fenders, the same being a division of my application bearing Serial Number 415,849, filed October 9th, 1920, and has for its object to provide a device of this character under the control of the operator of the vehicle so that said fender may be moved from an inoperative position to a running position and to an operative position or vice versa as the occasion may require and is particularly adapted for use on automobiles.

Another object of the invention is to provide manually operated actuating means for moving the fender, and more particularly the fender net or catching member, to the different positions.

A further object of the invention is to provide resilient means for normally drawing the uprights rearwardly or toward the vehicle.

A still further object of the invention is to provide means for limiting the outward or forward movement of the aforementioned uprights and also to provide means for limiting the rearward movement of said uprights.

With these ends in view, this invention consists in the details of construction and combination of elements hereinafter set forth and then specifically designated by the claims.

In order that those skilled in the art to which this invention appertains, may understand how to make and use the same I will describe its construction in detail, referring by numerals to the accompanying drawings forming a part of this application in which:—

Fig. 3, is a similar view to Fig. 1 showing the fender in its inoperative position and illustrating in dotted lines the position assumed thereby when the fender is in its operative position.

Fig. 4, is a plan view thereof with the fender in its operative position.

Figures 1, 2:
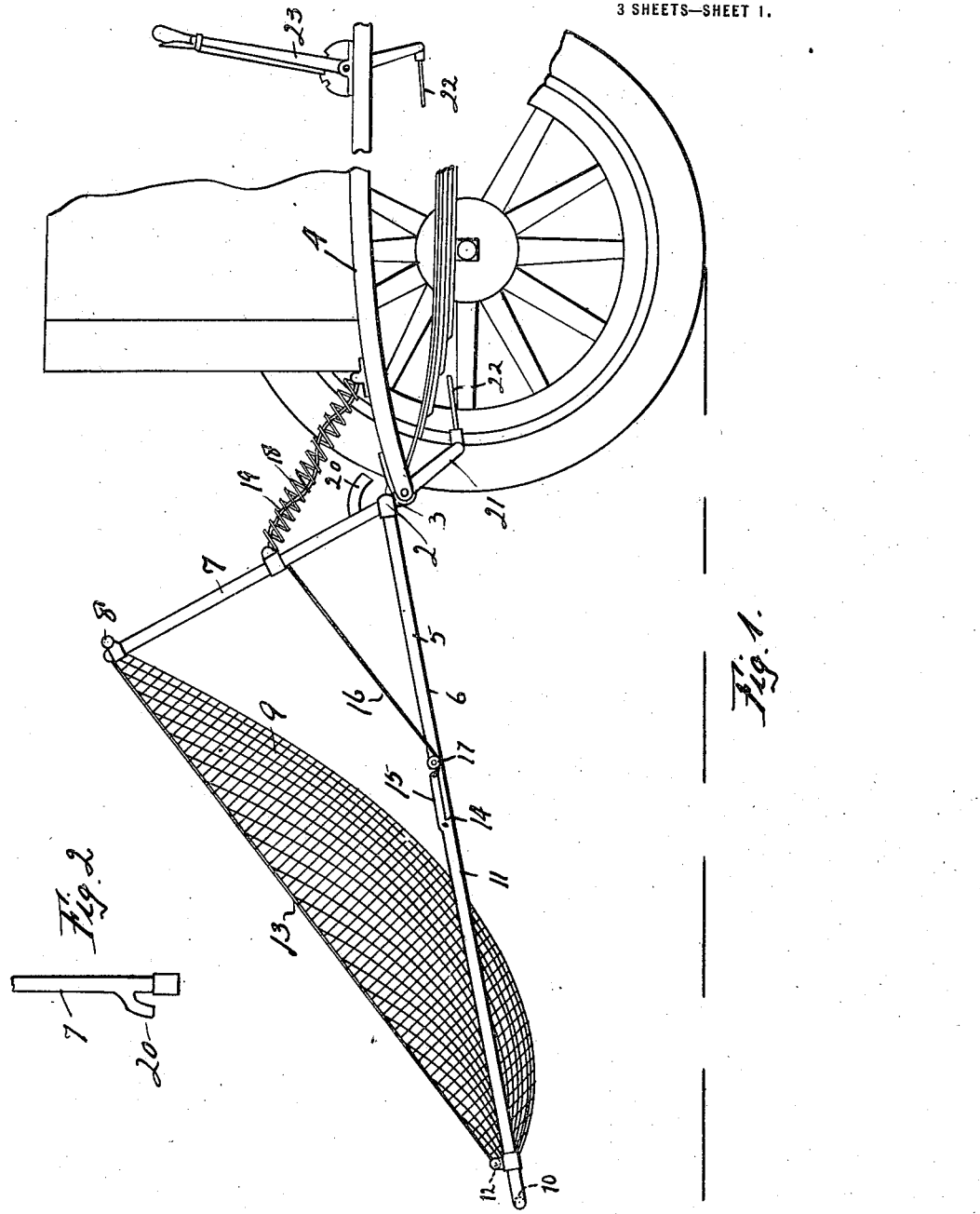
Fig. 1, is a fragmentary side elevation of an automobile showing my improved fender attached thereto in running position, a portion of the automobile being broken away and the near side wheel removed to illustrate the actuating mechanism.
Fig. 2, is a detail plan view of a portion of one of the uprights showing the means for limiting the rearward movement thereof.

In carrying out my invention as here embodied, 2 represents a transverse after-bar journalled in suitable brackets 3 secured to the vehicle frame or chassis 4 and to this bar are secured the side members 5 of the rear section 6 of the fender frame while intermediate its ends said bar has rotatably mounted thereon the uprights 7 the outer ends of which are braced by a cross bar 8. To said cross bar 8 is secured the upper end of the fender net or catching member 9 the lower end of which is attached to the supporting piece or member 10 secured between the side members 11 of the forward section of the fender frame, said side members being braced or stiffened by the cross rod 12 attached to said side members adjacent their outer ends. The sides of the fender net or catching member 9 are secured to ropes 13 or their equivalent which strengthen the edges of the net and assist in holding said net in its proper shape, the ends of the ropes being fastened to the uprights 7 and the side members 11.

The side members 11 of the forward fender frame section are hinged to the side members 5 of the rear fender frame section as at 14 in such manner as to make a joint that will "break" upward and each of the side members 11 is provided with an extension or over hanging finger 15 which coacts with the members 5 to stop the members 11 or the forward fender section when the fender sections or the side members 5 and 11 are in endwise alignment.

To the ends of the extensions or fingers 15 are fastened the ends of the cables 16 which run over guide pulleys 17 carried by the side members 5, said pulleys being swiveled, pivoted or otherwise fastened to the members 5 in the way best adapted for accommodating the cables 16, the opposite ends of the latter being fastened to the uprights 7. To the uprights 7 are attached the springs 18 which are also fastened to the vehicle frame and thereby normally maintain the uprights and in fact the entire fender in its approximate running position, as shown in Fig. 1 and said fender is prevented from being thrown lower than its operable position, as shown in Fig. 3, by means of a suitable cable 19 or its equivalent which is fastened to the vehicle frame and the uprights 7. This cable is preferably located within the coils of the springs. The uprights 7 and likewise the parts of the fender or fender frame sections are limited in their rearward movements or to the inoperative position shown in full lines in Fig. 3 by stop arms 20 carried by the uprights 7 adjacent their journal points and these arms are arranged to contact with portions of the brackets 3, as shown in Fig. 3. As the brackets 3 are out of line with the uprights 7 the stop arms are offset from the uprights as plainly shown in Fig. 2.

To the after bar 2 is secured a depending arm 21 having one end of a connecting rod 22 attached thereto, the opposite end of said rod being attached to a suitable part of a hand operated lever 23 which represents a manually operated actuating means for moving the fender to its different positions.

When the fender is in its inoperative position, as shown in full lines in Fig. 3 and it is desired to place the same in running condition or move it to the position shown in Fig. 1 the hand lever 23 is actuated in the proper direction which will move the depending arm 21 rearwardly, thus rotating the after rod 2 and cause the rear fender frame section 7 including the side members 5, to be moved downward and this movement will cause the uprights 7 to swing to the position shown in Fig. 1 where they will be maintained by the springs 18. With the uprights in this position the further downward movement of the side members 5 will increase the distance between the guide pulleys 17 and the points of attachment of the cables 16 to the uprights 7 thereby causing said cables to pass about the guide pulleys until the ends of said cables, where they are attached to the side members 11 of the forward fender frame section or drawn to the region of the guide post causing the extensions or fingers 15 to contact with the side members 5, said extensions or fingers preventing any further movement of the forward frame section relative to the rear frame section. The fender then being in running position, as shown in Fig. 1, should it be desired to move the same into operative position, as shown by dotted lines in Fig. 3 a further movement of the hand lever 23 will move the entire fender downward including both frame sections, the uprights and the net, until stopped by the cable 19, it being understood that the movement of the fender frame sections will be transmitted to the uprights 7 through the cables 16 and the ropes 13. When the pressure is relieved from the hand lever 23 the fender will be returned to its normal or running position by the spring 18.

When it is desired to return the fender to its inoperative position it is only necessary to actuate the hand lever 23 in the proper direction, which will raise the fender frame and permit the springs 18 to connect and thereby move the uprights 7 to the position shown in elevation in Fig. 3 in which position the uprights will be stopped by the stop arms 20. After this position has been reached, any further upward movement of the fender frame will cause the distance between the guide pulleys 17 and the points of attachment of the cables 16 to the uprights 7 to be shortened so that the strain upon said cables 16 is relieved and gravity will cause the outer or forward fender frame section to collapse upon the rear fender frame section as plainly shown in Fig. 3.

Of course I do not wish to be limited to the exact details of construction as herein shown as these may be varied within the limits of the appended claims without departing from the spirit of my invention.

Having thus fully described my invention, what I claim as new and useful is:—

1. A fender including brackets for attachment to a vehicle, an after bar journalled in said brackets, uprights rotatably mounted on said after bar, and stop arms carried by said uprights and offset therefrom and adapted to engage portions of said brackets for limiting the rearward movements of the uprights.

2. A fender including brackets for attachment to a vehicle, an after bar journalled in said brackets, uprights rotatably mounted on said after bar, stop arms carried by said uprights and offset therefrom and adapted to engage portions of said brackets for limiting the rearward movements of the uprights, springs attached to said uprights and the vehicle for normally drawing said uprights rearwardly, and means passing through said springs and attached to the vehicle for limiting the forward movements of said uprights.

3. A fender including brackets for attachment to a vehicle, an after bar journalled in said brackets, uprights rotatably mounted on said after bar, stop arms carried by said uprights and offset therefrom and adapted to engage portions of said brackets for limiting the rearward movements of the uprights, springs attached to said uprights and the vehicle for normally drawing said uprights rearwardly, means passing through said springs and attached to the vehicle for limiting the forward movements of said uprights, a rear fender section fixed to said after bar, a forward fender section hinged to the rear section, fingers carried by the forward frame section adapted to engage the rear fender section for stopping movements of the forward frame section relative to the rear frame section when the two are in endwise alignment, and means for moving the forward fender section into endwise alignment with the rear fender section when the latter is moved downward.

4. A fender including brackets for attachment to a vehicle, an after bar journalled in said brackets, uprights rotatably mounted on said after bar, stop arms carried by said uprights and offset therefrom and adapted to engage portions of said brackets for limiting the rearward movements of the uprights, springs attached to said uprights and the vehicle for normally drawing said uprights rearwardly, means passing through said springs and attached to the vehicle for limiting the forward movements of said uprights, a rear fender section fixed to said after bar, a forward fender section hinged to the rear section, fingers carried by the forward frame section adapted to engage the rear fender section for stopping movements of the forward frame section relative to the rear frame section when the two are in endwise alignment, guide pulleys on the rear frame section, and cables connected to the free ends of the fingers passing about the guide pulleys and attached to the uprights, said cables causing the forward frame to be moved into endwise alignment with the rear frame section as the distance between the guide pulleys and the points of attachment of the cables to the uprights is increased, said forward frame section moving out of alignment with the rear frame section by gravity when said distance is decreased.

5. A fender comprising brackets for attachment to a vehicle, an after bar journalled in said brackets, a primary fender section fixed to said after bar, a secondary fender section hinged to the primary section, means for limiting the upward movement of the secondary section with relation to the primary section beyond the endwise alignment therewith, uprights rotatably mounted on the after bar, cables connected to the secondary section and said uprights, guide pulleys on the primary section and over which the cables run to cause the secondary section to be moved into endwise alignment with the primary section as the distance between the guide pulleys and the points of attachment of the cables to the uprights is increased, said secondary section moving out of alignment with the primary section by gravity when said distance is decreased, ropes connected to the secondary section and the uprights, a catching member supported by said ropes, the uprights and the secondary section, springs attached to the uprights and the vehicle for normally holding the uprights in a certain position and tending to draw them inward, means for limiting the outward movement of the uprights, means for limiting the inward movement of the uprights, a depending arm carried by the after bar, a hand operative lever and a connecting rod attached to the lever and said arm whereby the primary fender section may be moved to different positions.

In testimony whereof, I have hereunto affixed my signature.

OMAR G. JONES.